(12) United States Patent
Schlaudraff

(10) Patent No.: US 11,079,583 B2
(45) Date of Patent: Aug. 3, 2021

(54) LASER MICROSCOPE SYSTEM

(71) Applicant: Leica Microsystems CMS GmbH, Wetzlar (DE)

(72) Inventor: Falk Schlaudraff, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 271 days.

(21) Appl. No.: 16/310,835

(22) PCT Filed: Jun. 30, 2017

(86) PCT No.: PCT/EP2017/066278
§ 371 (c)(1),
(2) Date: Dec. 18, 2018

(87) PCT Pub. No.: WO2018/002304
PCT Pub. Date: Jan. 4, 2018

(65) Prior Publication Data
US 2020/0310092 A1    Oct. 1, 2020

(30) Foreign Application Priority Data

Jun. 30, 2016   (DE) ..................... 10 2016 111 949.0

(51) Int. Cl.
*G02B 21/06*       (2006.01)
*G02B 21/00*       (2006.01)

(52) U.S. Cl.
CPC ....... *G02B 21/006* (2013.01); *G02B 21/0032* (2013.01)

(58) Field of Classification Search
CPC .. G02B 21/00; G02B 21/002; G02B 21/0032; G02B 21/0048; G02B 21/006; G02B 21/02; G02B 21/241
(Continued)

(56) References Cited

U.S. PATENT DOCUMENTS 7,071,451 B2 *   7/2006   Ishikawa .............. G02B 21/245
                                              250/201.3
7,130,117 B2 *   10/2006  Tsuyuki ................... G02B 7/08
                                              359/383
(Continued)

FOREIGN PATENT DOCUMENTS

DE       102012207240 A1    11/2013
EP           1617271 A2      1/2006
WO       WO 2015158861 A1   10/2015

*Primary Examiner* — Thong Q Nguyen
(74) *Attorney, Agent, or Firm* — Leydig, Voit & Mayer, Ltd.

(57) ABSTRACT

A laser microscope system includes a microscope and a lens defining an optical axis and a rear focal plane, as well as a laser and an optical laser system coupling a laser beam into the microscope such that it passes through the rear focal plane of the lens at a fixed point. The optical laser system has an offset lens movable along an axis of the laser beam path to move the laser beam focus in the direction of the optical axis. The optical laser system has a compensating lens arranged in the laser beam path and movable along the axis of the laser beam path. A controller and/or a mechanical coupling device carries out a movement of the compensating lens along the axis of the laser beam path when the lens is moved such that the laser beam continues to pass through the fixed point.

16 Claims, 4 Drawing Sheets

(58) Field of Classification Search
USPC .................................................. 359/368–390
See application file for complete search history.

(56) References Cited

U.S. PATENT DOCUMENTS

| | | | |
|---|---|---|---|
| 7,485,878 B2* | 2/2009 | Weiss ..................... | G01N 1/286 |
| | | | 250/486.1 |
| 10,107,999 B2* | 10/2018 | Tamano ................ | G02B 21/006 |
| 2002/0048025 A1 | 4/2002 | Takaoka | |
| 2003/0133190 A1 | 7/2003 | Weiss | |
| 2004/0114224 A1* | 6/2004 | Rigler ................ | G01N 21/6458 |
| | | | 359/383 |
| 2007/0076293 A1 | 4/2007 | Wolleschensky et al. | |
| 2010/0277581 A1* | 11/2010 | Matsumoto ............ | G02B 21/36 |
| | | | 348/79 |
| 2014/0147884 A1 | 5/2014 | Schlaudraff et al. | |
| 2017/0219809 A1 | 8/2017 | Wald et al. | |

* cited by examiner

LASER MICROSCOPE SYSTEM

CROSS-REFERENCE TO PRIOR APPLICATIONS

This application is a U.S. National Phase Application under 35 U.S.C. § 371 of International Application No. PCT/EP2017/066278, filed on Jun. 30, 2017, and claims benefit to German Patent Application No. DE 10 2016 111 949.0, filed on Jun. 30, 2016. The International Application was published in German on Jan. 4, 2018 as WO 2018/002304 under PCT Article 21(2).

FIELD

The invention relates to a laser microscope system with a microscope table for receiving a sample and a lens which defines an optical axis and a rear focal plane of the lens and with a laser and an optical laser system which is arranged downstream of the laser and which couples the laser beam generated by the laser into the microscope such that the laser beam passes through the rear focal plane of the lens at a fixed point and is focused by the lens on an object plane of the microscope.

The term, "laser microscope system," as used herein means, for example, a laser microdissection system, but also other systems that use a microscope and a laser beam coupled into the lens of the microscope, e.g., systems used for laser excitations (e.g., optogenetics). For the sake of simplicity, reference is made below, in particular, to laser microdissection systems, without restricting the present invention thereto.

BACKGROUND

Methods for processing biological samples by laser microdissection have already existed since the middle of the 1970's and have since been continuously developed further. In laser microdissection, cells, tissue regions, etc., can be isolated from a biological sample ("object") and can be obtained as so-called dissectates. A particular advantage of laser microdissection is the short contact of the sample with the laser beam, by which it is hardly changed. The dissectates can be obtained in various ways.

For example, in known methods, a dissectate can be isolated from a sample using an ultraviolet laser beam by a cutting line generated with the laser beam, and falls under the influence of gravity into a suitable dissectate collecting container. In doing so, the dissectate may also be cut out of the sample together with a membrane adhering to the sample. In contrast, in so-called laser capture microdissection, a thermoplastic membrane is heated by means of an appropriate infrared laser beam. In the process, the membrane melts with the desired region of the sample and can be removed by tearing in a subsequent step. A further alternative consists in attaching the dissectate to a cover of a dissectate collecting container using the laser beam. In known inverse microscope systems for laser microdissection, dissectates transported upwards by means of a transport pulse can also be attached to the bottom of a dissectate collecting container which is provided with an adhesive coating.

Known microscope systems for laser microdissection have an incident light device, into the beam path of which is coupled a laser beam. The laser beam is focused by the respectively used microscope lens on the sample, which rests on a microscope table that can be moved in a motorized manner. A cutting line may be generated by moving the microscope table during cutting, in order to move the sample, relative to the stationary laser beam. This, however, has the disadvantage, among other things, that the sample cannot be easily viewed while producing the cutting line, since the sample moves in the field of view, and the image appears blurred or smeared without further compensation measures.

More advantageous are, therefore, laser microdissection systems that have laser deflection or laser scanning devices configured to move the laser beam or its point of impingement on the stationary sample to be dissected. Such laser microdissection systems, which shall also be used in the context of the present invention and offer particular advantages there, are described in detail below. A particularly advantageous laser microscope system, which has a laser deflection device with mutually adjustable glass wedges in the laser beam path, is described in, for example, EP 1 276 586 B1.

In both cases, i.e., in systems with moving or stationary samples, pulsed lasers are typically used, wherein each laser pulse generates a hole or recess in the sample. A cutting line is produced by an array of such holes or recesses—optionally, with overlap.

Laser microdissection can be used for obtaining individual cells, cell compartments, or defined tissue regions having, for example, a diameter of about 500 μm. With suitable control, the laser beam can also cut out significantly larger regions which are limited only by the size of the object slide on which the sample to be cut is arranged.

As a rule, however, the dissectates have a size only in the μm range, e.g., around 20 μm or below, separated from the surrounding tissue with a laser beam, and subsequently subjected, for example, to various diagnostic analysis methods. In oncology, laser microdissection can be used, for example, to isolate specific (tumor) cells from a microscopic section and to examine them for specific metabolites, RNA expression levels, DNA mutations, or proteins.

In the above-mentioned laser microdissection system according to EP 1 276 586 B1, a scanning device is used to move the laser beam focus perpendicularly to the optical axis in the object plane. This scanning device operates with two optical wedges (prisms, glass wedge plates) whose surfaces are inclined towards the optical axis (wedge angle) and which are rotatably mounted about the optical axis. By rotating the optical wedges with respect to one another, a beam deflection of the laser beam is generated so that the laser beam focus can be moved in a defined manner in the object plane in order to dissect a sample located there. With regard to the structure and functionality of this scanning device, reference is expressly made to the mentioned European patent specification EP 1 276 586 B1. In practice, corresponding systems are characterized by an upright base stand with a fixed revolving turret that is not movable in the z direction (perpendicular to the object plane), wherein the microscope table is moved in said z direction in order to adjust the focus. During dissection, the microscope table is fixed in the x and y directions (i.e., in the object plane).

Other laser microdissection systems are typically based upon inverse microscopes and use a fixed laser beam (without scanning device), so that the sample is cut in the x and y directions by moving the microscope table. In such systems, the focus is adjusted by moving the revolving turret in the z direction; the microscope table itself then generally cannot be moved in the z direction.

SUMMARY

In an embodiment, the present invention provides a laser microscope system. The laser microscope system includes a microscope having a microscope table configured to receive a sample and a lens which defines an optical axis and a rear focal plane of the lens, as well as a laser and an optical laser system which is arranged downstream of the laser and which is configured to couple a laser beam generated by the laser into the microscope such that the laser beam passes through the rear focal plane of the lens at a fixed point and is focused by the lens on an object plane of the microscope. The lens is movable in a direction of the optical axis so as to adjust the focus. The optical laser system has an offset lens which is movable along an axis of the laser beam path so as to move the laser beam focus in the direction of the optical axis of the lens. The optical laser system has a compensating lens which is arranged in the laser beam path and is movable along the axis of the laser beam path. A controller and/or a mechanical coupling device is configured to carry out a movement of the compensating lens along the axis of the laser beam path based on the lens being moved so as to adjust the focus such that the laser beam continues to pass through the fixed point of the rear focal plane of the lens.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
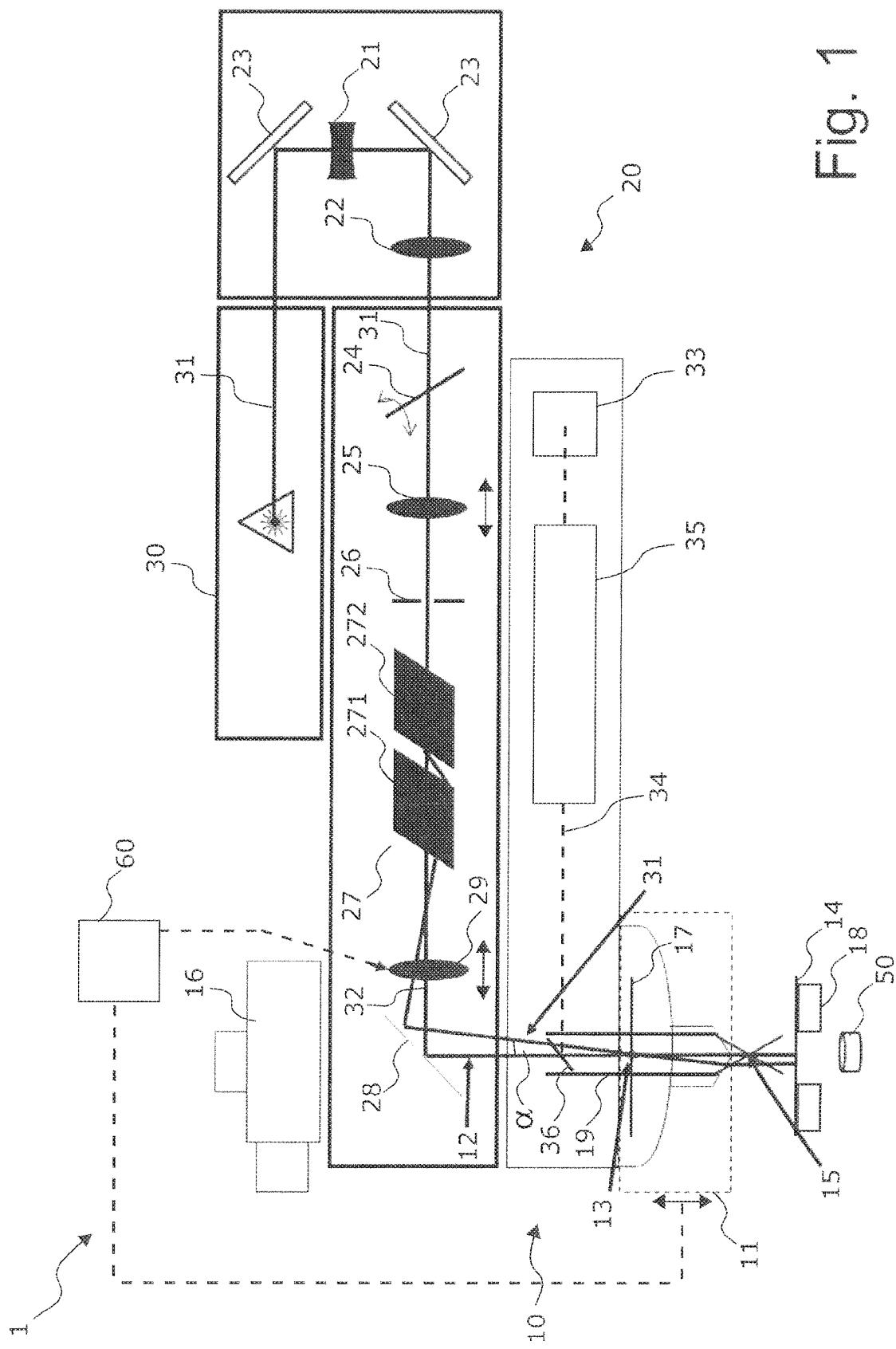
FIG. 1 schematically shows a first embodiment of a laser microscope system according to the invention, prior to a focus adjustment.

The present invention recognizes that a disadvantage of the prior art is that the scanning devices based upon optical wedges for moving the laser beam focus in the object plane cannot be transferred to inverse microscopes or to those with microscope tables that cannot be moved in the z direction (fixed stage systems), which adjust the focus via the microscope lens or the revolving turret, and not via the z movement of the microscope table. The reason is that it is necessary for deflection of the laser beam focus in the case of the scanning device based upon optical wedges that the laser beam always pass through the rear focal plane of the lens (back focal plane) at the same point, in order to guarantee reliable cutting and impingement of the laser focus on the sample. When the microscope lens is moved in the z direction in order to adjust the focus, the position of the rear focal plane changes at the same time so that the laser beam passes through a different point in this plane.

An embodiment of the present invention provides a laser microscope system which offers the possibility of using a lens that can be moved in the direction of the optical axis in order to adjust the focus, without having to accept the aforementioned disadvantages. In particular, the laser microscope system is to be used for laser microdissection with a scanning device that moves the laser beam focus perpendicularly to the optical axis in the object plane of the microscope.

According to a first embodiment of the invention, a laser microscope system is provided which has a microscope with a microscope table for receiving a sample and at least one lens which defines an optical axis and a rear focal plane of the lens, and has a laser—in particular, a UV laser—and an optical laser system, which is arranged downstream of the laser and which couples the laser beam generated by the laser into the microscope such that the laser beam passes through the rear focal plane of the lens at a fixed point and is focused by the lens on an object plane of the microscope, wherein the lens, or the entire revolving turret in the present case, is designed to be movable in the direction of the optical axis in order to adjust the focus. The optical laser system has an offset lens which can be moved along the axis of the laser beam path in order to move the laser beam focus in the direction of the optical axis of the lens. As a result, the focus of the (UV) laser can be brought to coincide with the focus of the lens and, particularly when the microscope illumination is guided through the lens, also with the visual illumination focus, for example. The optical laser system additionally has a compensating lens arranged in the laser beam path and movable along the axis of the laser beam path. Furthermore, a controller and/or a mechanical coupling device is provided which carries out a movement of this compensating lens along the axis of the laser beam path when the lens is moved in the direction of the optical axis in order to adjust the focus so that the laser beam continues to pass through the fixed point of the rear focal plane of the lens, even after the focus adjustment.

According to a second embodiment of the invention, a laser microscope system is provided which has a microscope with a microscope table for receiving a sample and at least one lens which defines an optical axis and a rear focal plane of the lens, and has a laser—in particular, a UV laser—and an optical laser system, which is arranged downstream of the laser and which couples the laser beam generated by the laser into the microscope such that the laser beam passes through the rear focal plane of the lens at a fixed point and is focused by the lens on an object plane of the microscope, wherein the lens is again, in this case, designed to be movable in the direction of the optical axis in order to adjust the focus. In this case, the optical laser system also has an offset lens which can be moved along the axis of the laser beam path in order to move the laser beam focus in the direction of the optical axis of the lens. As a result, the focus of the (UV) laser can be brought to coincide with the focus of the lens and also with the illumination focus. According to a second embodiment of the invention, the optical laser system as such (i.e., initially, without the compensating lens according to the first embodiment of the invention) is at least partially mounted on a slide movable along the axis of the laser beam path, and a controller and/or a mechanical coupling device is provided which carries out a movement of this slide when a movement of the lens in the direction of the optical axis is carried out in order to adjust the focus so that the laser beam continues to pass through the fixed point of the rear focal plane of the lens, even after the focus adjustment.

The corresponding features according to the first or second embodiment of the invention both lead to the objective that the laser beam coupled into the microscope still passes through the fixed point of the rear focal plane of the lens, even if a movement of the lens along the optical axis is carried out in order to adjust the focus. This objective can be achieved by two different measures. According to the first embodiment, said compensating lens is moved in the optical laser system along the axis of the laser beam path in order to compensate for the movement of the rear exit pupil plane of the lens during a focus adjustment. The magnitude of the movement of the compensating lens necessary for this compensation can, for example, be determined empirically in practice. The corresponding relationship can be stored, for example, in a lookup table which the controller accesses. Alternatively, a mechanical coupling device can be provided which carries out the necessary movement of the compensating lens in a mechanical manner—for example, by means of mechanical forced coupling during movement of the lens.

According to the second embodiment of the invention, a movement of the rear exit pupil plane, upon movement of the lens in the direction of the optical axis in order to adjust the focus, is compensated for by a corresponding movement of the slide, on which the optical laser system is mounted at least partially—preferably, with all components except for a deflection mirror which deflects the laser beam in the direction of the optical axis of the lens—possibly, also together with the laser. In practice, upon movement of the lens in the direction of the optical axis, the slide can be moved in the same direction, so that the distance of the optical laser system—especially of a scanning device present in the optical laser system—to the rear focal plane of the lens is maintained.

In the laser microscope system according to the second embodiment of the invention, it is advantageous if a movement of the slide along the axis of the laser beam path is mechanically coupled via a mechanical coupling device to a movement of the lens along the optical axis—in particular, in the ratio 1:1. A movement of the lens in order to adjust the focus then necessarily leads to a corresponding movement of the slide along the axis of the laser beam path so that said distance to the rear focal plane of the lens always remains constant.

In the laser microscope system according to the second embodiment of the invention, it can be advantageous if the optical laser system additionally has a compensating lens (according to the first embodiment of the invention) arranged in the laser beam path and movable along the axis of the laser beam path, wherein the controller and/or the mechanical coupling device are then designed such that a movement of the slide and/or the compensating lens along the axis of the laser beam path is carried out when a movement of the lens is carried out in order to adjust the focus so that the laser beam continues to pass through the fixed point of the rear focal plane of the lens. This embodiment thus corresponds to a combination of the first and second embodiments of the invention and permits higher flexibility and, possibly, also precision in certain applications in which larger movements of the lens in the z direction are required, such as, for example, when cutting thick samples with three-dimensional cutting lines or in successive cutting of thick materials in z stacks.

As already mentioned, various possible uses of a laser microscope system according to the invention according to the first and second embodiments are conceivable, but, in particular, such in which the optical laser system contains a scanning device in order to move the laser beam focus perpendicularly to the optical axis in the object plane. Such scanning devices are used in laser microdissection systems, but can also be used for laser excitation systems, in which a laser beam scans a sample in order to, for example, excite fluorescent radiation. The term, "axis of the laser beam path," in this case means the axis of the non-deflected laser beam path.

In a particularly advantageous manner, a scanning device is used which has two optical wedges that can be rotated about the axis of the laser beam path, wherein the resulting deflection angle of the laser beam to the optical axis can be varied by rotating the optical wedges with respect to one another, and wherein the laser beam passes through the aforementioned fixed point of the rear exit pupil of the lens for all deflection angles, wherein the exit pupil coincides with the rear focal plane. Such a scanning device is known, in particular, from already mentioned EP 1 276 586 B1. The optical wedges are implemented there as glass wedge plates which generate a beam deflection by their wedge angles, wherein the resulting deflection angle of the laser beam to the axis of the laser beam path can be varied by rotating the glass wedge plates with respect to one another. In this case, the laser beam passes through a fixed point of the rear focal plane of the lens for all deflection angles. Said fixed point is preferably selected in the center of the exit pupil. This has the advantage that the laser beam strikes the sample perpendicularly. With regard to the structure and functionality of such a scanning device, reference is expressly and comprehensively made to the mentioned European patent specification. Such a scanning device is, in particular, embodied as a component of a laser microdissection system, as described in the exemplary embodiments.

A laser microscope system according to the first embodiment of the invention advantageously has an optical laser system in which the compensating lens movable in the direction of the axis of the laser beam path is arranged downstream, in relation to the direction of the laser beam path, of the scanning device. The same applies to a laser microscope system according to the second embodiment of the invention, insofar as a compensating lens is present here. Frequently, the axis of the laser beam path to be coupled into the microscope is perpendicular to the optical axis of the microscope lens. The laser beam path is coupled into the microscope by means of a deflection mirror and guided to the microscope lens, from which the laser beam is then focused on the object plane of the microscope. The deflection mirror is generally a beam splitter, which transmits light of the observation beam path coming from the sample through the microscope lens in the direction of the microscope tube, while reflecting light of the laser beam path as completely as possible. The compensating lens used for the laser microscope system according to the first embodiment of the invention is, in such a structure, advantageously arranged between the scanning device and deflection mirror.

In a laser microscope system according to the second embodiment of the invention, a deflection mirror for coupling the laser beam path into the optical axis of the lens can also be provided, wherein the deflection mirror is, expediently, arranged downstream of the scanning device. In such a structure, it is advantageous if the slide carries those elements of the optical laser system that are arranged upstream of the deflection mirror. This may, in particular, be all elements of the optical laser system, including the laser itself, except for the deflection mirror. If a compensating lens is present in the laser microscope system according to the second embodiment of the invention, it is, in such a structure, arranged, advantageously, between the scanning device and deflection mirror.

With regard to both embodiments of the invention, the mentioned offset lens, which is movable along the axis of the laser beam path in order to move the laser beam focus in the direction of the optical axis of the lens, makes it possible to bring the (UV) laser beam focus to coincide with the focus of the illumination beam path in the microscope. This is advantageous if the object or the sample is to be illuminated in parallel to the exposure to the laser beam, e.g., with visible light, and is to be observed before, during, and/or after the dissection.

The offset lens is, advantageously, arranged upstream of said scanning device and, particularly, also of a laser beam aperture stop in the optical laser system, wherein the laser beam aperture stop in turn is, expediently, arranged upstream of the scanning device.

The object or the sample is typically, and expediently, also observed visually by means of the microscope. For this purpose, the laser microscope system according to the first and/or second embodiment advantageously has an illumination device with a light source and an optical illumination system for generating an, in particular, visual illumination beam path, wherein the optical illumination system has a deflection mirror for coupling the illumination beam path into the optical axis of the lens. Furthermore, the illuminating beam path can, in particular, be guided via the lens to the sample.

The invention according to the first and second embodiments allows, in particular, the use of a laser microdissection system with a scanning device based upon the above-described rotatable optical wedges in combination with a lens that is movable in order to adjust the focus, as is usually used in inverse microscopes or the already mentioned fixed stage microscopes. In this respect, reference is, in particular, also made to the exemplary embodiments.

Further advantages and embodiments of the invention arise from the description and the accompanying drawing.

It goes without saying that the features mentioned above and below may be used not only in the particular combination specified, but also in other combinations or alone, without departing from the scope of the present invention.

The figures are explained comprehensively below. The same reference numbers designate the same elements. The figures schematically show examples of a laser microscope system according to the first and second embodiments of the invention. The laser microscope system is denoted by 1 in each case and is designed as a laser microdissection system.

All FIGS. 1 through 4 share the basic structure of a laser microscope system 1, which is briefly explained below. The laser microscope system 1 has a microscope 10 and a UV laser 30 with an optical laser system 20 which is arranged downstream of the laser. The optical laser system 20 serves to couple the laser beam 31 generated by the laser 30 into the microscope 10.

The microscope 10 has, in a known manner, a lens 11 and a tube 16 to which optical and/or electronic outputs for an eyepiece and/or a camera, shown schematically, can be attached.

In the laser microscope system 1, an illumination device with a light source 33 and an optical illumination system 35 known per se, and therefore not explained in greater detail, for generating a visual illumination beam path 34 are provided, wherein the optical illumination system 35 has a deflection mirror 36 for coupling the illumination beam path 34 into the optical axis 12 of the lens 11. In the illustrated case, the illumination beam path 34 is guided onto the sample via the lens 11.

The laser beam 31 generated by the UV laser 30 is coupled into the microscope 10 via an optical laser system 20 which is arranged downstream of the laser. For this purpose, the optical laser system 20 first has a negative lens 21 and a positive lens 22, which expand and collimate the laser beam 31, as well as corresponding deflection devices 23, in order to supply the laser beam with the expanded laser beam cross-section to the subsequent elements of the optical laser system 20. Next, the laser beam 31 passes through an attenuator 24, by means of which the energy of the laser beam can be adjusted. The attenuator 24 is followed by the offset lens 25, which brings the UV laser beam focus to coincide with the VIS focus of the illumination beam path 34. For this purpose, the offset lens 25 can be moved along the axis 32 of the laser beam path. The laser beam aperture stop 26 is arranged downstream of the offset lens 25. The opening of the laser beam aperture stop 26 determines the diameter of the laser beam 31, and thus the cutting width of the laser beam. The laser beam 31 then enters a scanning device 27 which has two optical wedges 271 and 272 rotatable about the axis 32 of the laser beam path, wherein the resulting deflection angle α of the laser beam 31 to the optical axis 12 can be varied by rotating these optical wedges 271, 272 with respect to one another. As already mentioned several times, details of the functionality and structure of a scanning device 27 can be taken from EP 1 276 586 B1 and are therefore not described in detail here.

The laser beam 31 is coupled into the microscope 10 by a deflection mirror 28 formed in a beam splitter such that it passes through the lens 11 and is focused by the lens 11 into a focal plane 15 (front focal plane). For all possible deflection angles α, the laser beam 31 passes through the same fixed point 13 of the rear focal plane 17, which can preferably be located in the center, i.e., on the optical axis 12. From there, it passes through the lens 11 and is focused by it into the focal plane 15. For laser microdissection, the object plane 14 must coincide with the focal plane 15 so that a sample located on the object plane 14 can be cut. For cutting, the laser beam focus is moved in the object plane 14, i.e., on the sample to be cut, by means of the scanning device 27, by setting corresponding reflection angles α. By moving the laser beam focus appropriately on the sample, a cutting line is then generated, and a desired region of the sample is cut out using the laser beam.

FIG. 1 shows an embodiment of a laser microdissection system 1 in which the lens 11 or a revolving turret carrying the lens 11 is designed to be movable in the direction of the optical axis 12 (indicated by the double arrow) in order to adjust the focus. In previously customary embodiments, the focus was adjusted by moving the microscope table in the direction of the optical axis 12. Since this did not result in a movement of the rear focal plane 17 of the lens 11, it was ensured that the deflected laser beam 31 always passed through the fixed point 13. In the present embodiment, however, the lens 11 is designed to be movable in the direction of the optical axis 12, in order to adjust the focus. In order to adjust the focus, the lens 11 in the situation illustrated according to FIG. 1 is moved downwards until the focal plane 15 coincides with the object plane 14. As a result, however, the rear focal plane 17 moves in a corresponding manner, so that it is no longer ensured that the laser beam 31 passes through said point 13 of the rear focal plane 17. A movement of the point of impingement of the laser beam 31 on the rear focal plane 17 during a movement of the lens 11 can be compensated for by the compensating lens, denoted by 29, which is designed, as a component of the optical laser system 20, to be movable along the axis 32 of the laser beam path. In a basic position, the compensating lens 29 is in the position shown in FIG. 1.

It can be seen from FIG. 1 that the object plane 14 does not coincide with the focal plane 15. Strictly speaking, 15 denotes only the focus of the microscope lens 11 for the illumination or observation beam path used. The illumination beam path 19 is shown only schematically. The actual focal plane extends in a known manner through the point denoted by 15 in parallel to the object plane 14 and in parallel to the rear lens focal plane 17. In order to adjust the focus, the lens 11 is now moved in the direction of the optical axis 12 towards the object plane 14 until the focal plane 15 coincides with the object plane 14. This situation is shown in FIG. 2.

Figure 2:
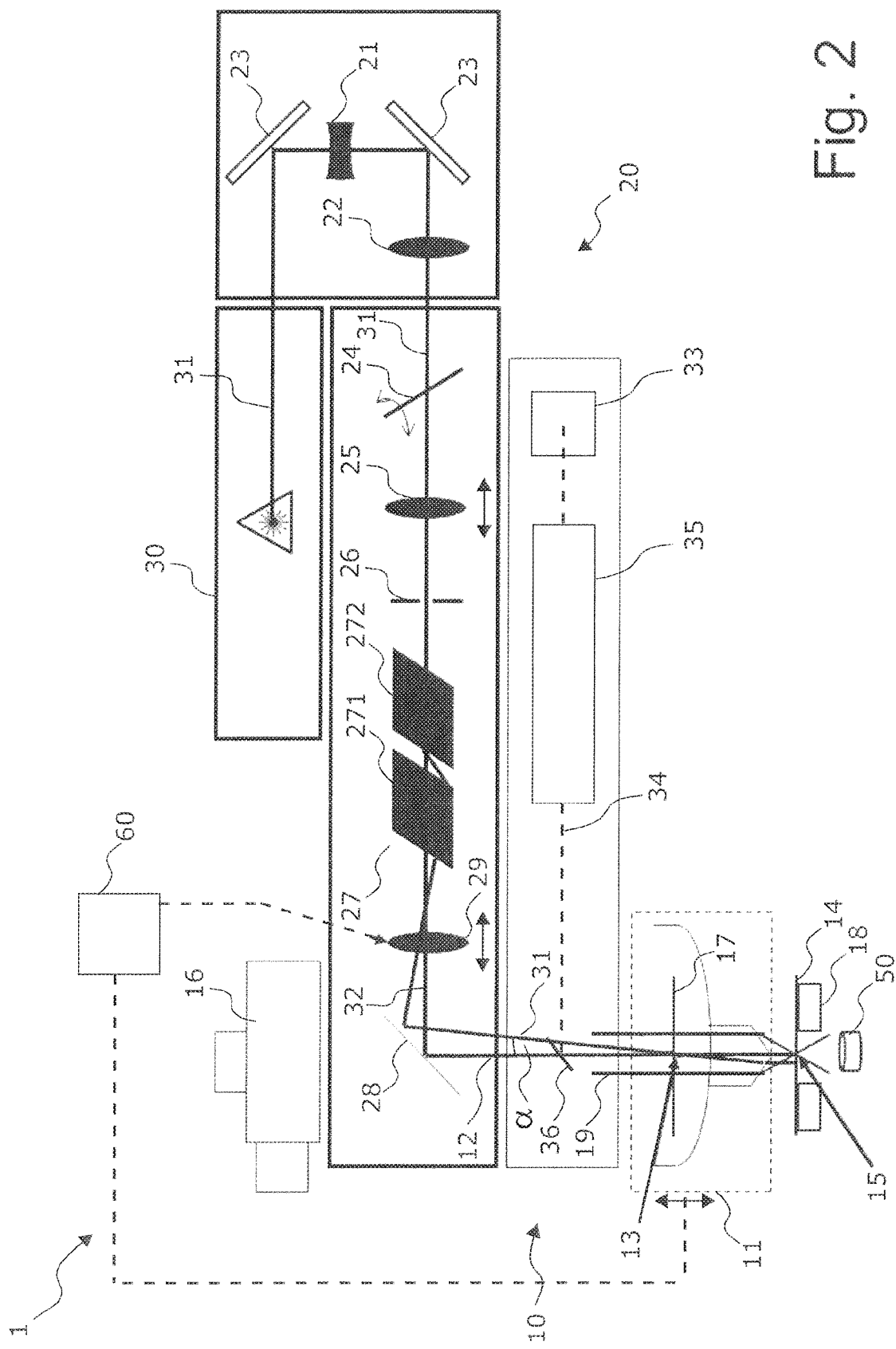
FIG. 2 shows the embodiment of FIG. 1 after a focus adjustment, FIG. 3 schematically shows a second embodiment of a laser microscope system according to the invention, prior to a focus adjustment.

FIG. 2 shows the situation where the lens 11 focuses the laser beam 31 on the focal plane 15 coinciding with the object plane 14 of the microscope 10. It can also be seen in FIG. 2 that the laser beam 31 continues to pass through said fixed point 13 of the rear focal plane 17. This is achieved by corresponding movement of the compensating lens 29 of the optical laser system 20. For this purpose, the compensating lens 29 was moved slightly opposite to the lens movement for focus adjustment (i.e., away from the object) and thus in the direction of the scanning device 27 along the axis 32 of the laser beam path. The movement of the compensating lens 29 is controlled by a controller 60, which receives the movement of the lens 11 as an input signal. The relation to the resulting necessary movement of the compensating lens 29 can be stored in the controller 60 as a lookup table or as a functional relationship. The compensating lens 29 may also be moved mechanically with the movement of the lens 11 via a mechanical coupling device, which also may be denoted by 60.

FIGS. 1 and 2 clearly show that, by moving the compensating lens 29, the illustrated laser microdissection system 1 can also be used with a focusable lens 11. In this way, it is also possible to focus into different sample regions (parallel to the optical axis 12) within a sample to be cut. This is particularly useful for cutting thick samples. After completion of the cutting process, the excised microdissectate is collected by a collecting container 50 and can then be supplied to further analysis.

Figure 3:
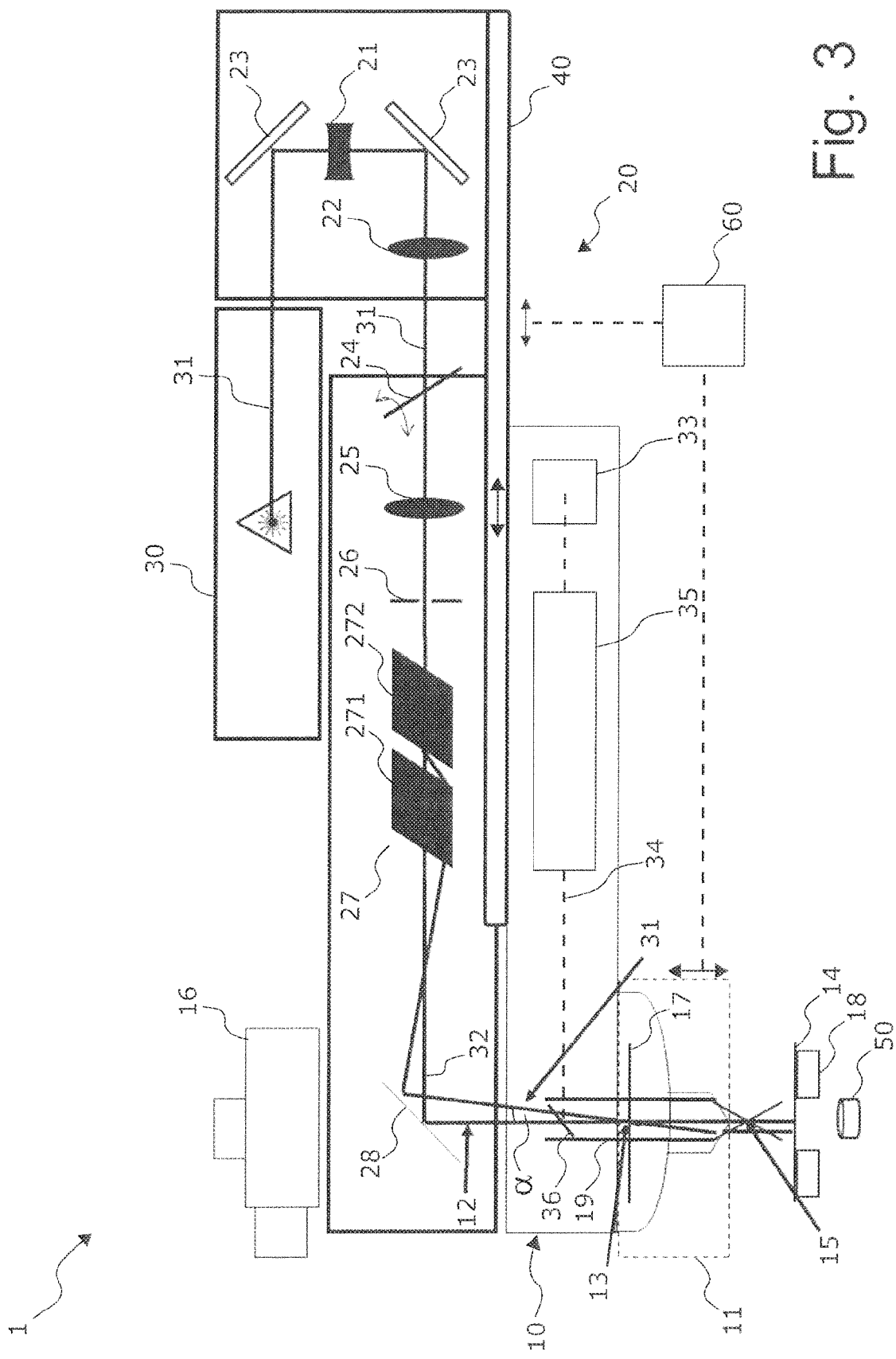
Figure 4:
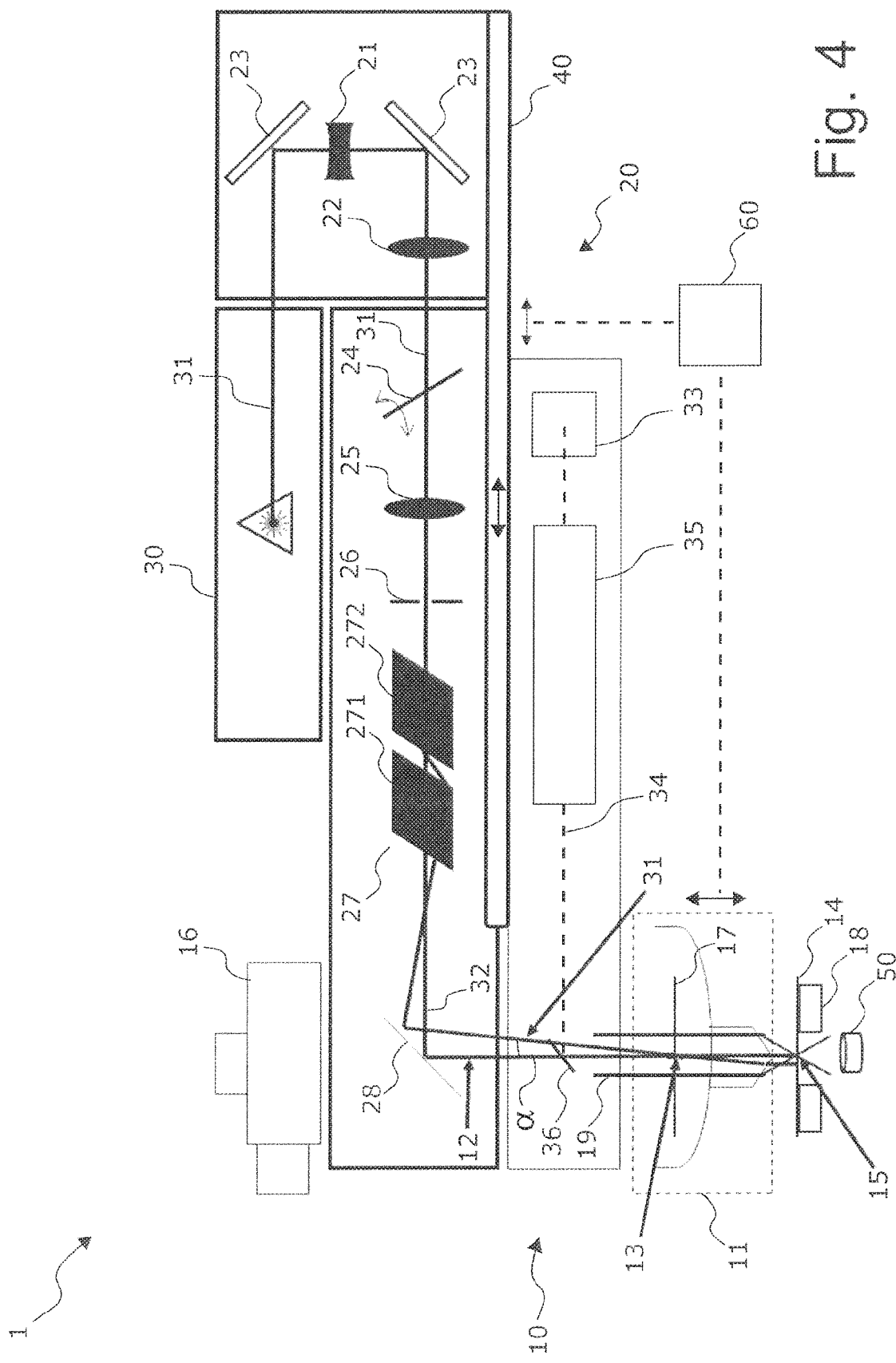
FIG. 4 shows the embodiment of FIG. 3 after a focus adjustment.

FIGS. 3 and 4 show an embodiment of a laser microscope system according to the second embodiment of the invention. The laser microscope system is again embodied as a laser microdissection system 1. With regard to the structure and the functionality, reference is made to the above descriptions.

FIG. 3 shows a structure in which the essential components of the optical laser system 20 are mounted on a slide 40. In addition, the laser 30 can also be arranged to be movable with the slide 40. The following elements of the optical laser system 20 are found on the slide 40: the deflection devices 23, as well as the negative lens 21 and the positive lens 22; furthermore, the attenuator 24, offset lens 25, laser beam aperture stop 26, and scanning device 27 elements, arranged in series. Other possible implementations are obvious to the person skilled in the art. In particular, elements between which a parallel laser beam path extends can be pulled apart without influencing the beam path. In such a case, the corresponding preceding elements of the optical laser system need not be mounted on the slide 40, while only the succeeding elements of the optical laser system 20 have to be mounted on the slide 40.

FIG. 3 shows, analogously to FIG. 1, a situation in which the focal plane 15 does not coincide with the object plane 14 of the microscope 10. In order to adjust the focus, the lens 11 is moved along the optical axis 12 until the focal plane 15 coincides with the object plane 14. This situation is shown in FIG. 4. FIG. 4 shows a lens 11 moved in the direction of the optical axis 12 (the movement is again indicated by the double arrow). Such a movement results in a corresponding movement of the rear focal plane 17, as a result of which, without any countermeasures, the laser beam 31 would no longer pass through the same point 13 of the rear focal plane 17, as in FIG. 3. In order to ensure that the point 13 of the rear focal plane 17 is also maintained when moving the lens 11 along the optical axis 12, the slide 40 and, with it, all elements of the optical laser system 20 located on the slide 40 are moved accordingly. In the example shown, a movement of the slide 40 is coupled to a movement of the lens 11. This coupling can take place via a controller 60 or, alternatively, also mechanically, by means of a mechanical coupling device, which can likewise be denoted by 60. The movement of the slide 40 takes place in the same direction as the movement of the lens 11. The movement is preferably carried out in a ratio of 1:1.

In the embodiment shown in FIGS. 3 and 4 of a laser microdissection system 1 according to the second embodiment of the invention, the optical laser system 20 can, additionally, also, have a compensating lens 29 according to the first embodiment of the invention. With regard to details of the arrangement and function of such a compensating lens 29, reference is made to the above explanations, in conjunction with FIGS. 1 and 2. The compensating lens is, preferably, arranged between the scanning device 27 and deflection mirror 28. It can be mounted either on the slide 40 or not on the slide 40. In both cases, the possible application range of the system 1 increases with respect to flexibility and the possibility of dissecting larger sample regions in the z direction. The controller 60 and/or the mechanical coupling device is designed such that the slide 40 and/or the compensating lens 29 is moved along the axis 32 of the laser beam path when the lens 11 is moved in order to adjust the focus, so that the laser beam 31 continues to pass through the fixed point 13—in particular, the center of the rear focal plane 17 of the lens 11.

The invention was explained with reference to an upright microscope 10. However, it can also be implemented without restriction on an inverse microscope in which the lens or the lenses are arranged below the microscope table 18, and the collecting container for the dissectates is arranged above the microscope table 18. A method for laser-assisted transfer of the dissectates from the sample to the collecting container is known from the prior art.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Laser microscope system, laser microdissection system
10 Microscope
11 Lens
12 Optical axis
13 Point of the rear lens focal plane
14 Object plane
15 Focal plane, front focal plane
16 Tube
17 Rear lens focal plane
18 Microscope table
19 Illumination beam path
20 Optical laser system
21 Negative lens
22 Positive lens
23 Deflection device
24 Attenuator
25 Offset lens
26 Laser beam aperture stop
27 Scanning device
28 Deflection mirror
29 Compensating lens
30 Laser
31 Laser beam
32 Axis of the laser beam path
33 Light source
34 Illumination beam path
35 Optical illumination system
36 Deflection mirror
40 Slide
50 Collecting container
60 Controller
271 Optical wedge
272 Optical wedge
α Deflection angle

The invention claimed is:

1. A laser microscope system comprising:
a microscope having a microscope table configured to receive a sample, an illumination device with a light source configured to illuminate the sample, and a lens which defines an optical axis and a rear focal plane of the lens and is arranged to image the sample; and
a laser configured to generate a laser beam proliferating along a laser beam path and an optical laser system which is arranged downstream of the laser and which is configured to couple the laser beam into the microscope such that the laser beam passes through the rear focal plane of the lens at a fixed point and is focused by the lens on an object plane of the microscope in such a manner that the sample is cut by the laser beam,
wherein the lens is movable in a direction of the optical axis so as to adjust a visual illumination focus, and whereby a movement of the lens causes a shift of the rear focal plane of the lens,
wherein the optical laser system has an offset lens which is movable along an axis of the laser beam path so as to move a focus of the laser beam in a direction of the optical axis of the lens such that the focus of the laser beam coincides with the visual illumination focus,
wherein the optical laser system has a compensating lens which is arranged in the laser beam path and is movable along the axis of the laser beam path, or wherein the optical laser system is mounted at least partially on a slide movable along the axis of the laser beam path and wherein a controller and/or a mechanical coupling device is configured to carry out a movement of the compensating lens along the axis of the laser beam path, or to carry out a movement of the slide, based on the lens being moved so as to compensate movement of a point of impingement of the laser beam on the rear focal plane caused by movement of the lens such that the laser beam continues to pass through the fixed point of the rear focal plane of the lens and stays focused onto the sample.

2. The laser microscope system according to claim 1, wherein the optical laser system contains a scanning device configured to move the laser beam focus perpendicularly to the optical axis in the object plane.

3. The laser microscope system according to claim 2, wherein the scanning device has two optical wedges rotatable about the axis of the laser beam path, wherein a resulting deflection angle of the laser beam to the optical axis is variable by rotating the optical wedges, and wherein the laser beam is configured to pass through the fixed point of the rear focal plane of the lens for all deflection angles.

4. The laser microscope system according to claim 2, wherein the compensating lens is arranged downstream of the scanning device.

5. The laser microscope system according to claim 2, wherein the offset lens is arranged upstream of the scanning device.

6. The laser microscope system according to claim 1, wherein the optical laser system is mounted at least partially on the slide movable along the axis of the laser beam path, and wherein the controller and/or the mechanical coupling device is designed such that the movement of the slide is carried out along the axis of the laser beam path based on the movement of the lens being carried out so as to compensate the movement of the point of impingement of the laser beam on the rear focal plane caused by the movement of the lens such that the laser beam continues to pass through the fixed point of the rear focal plane of the lens and stays focused onto the sample.

7. The laser microscope system according to claim 6, wherein the optical laser system comprises the compensating lens arranged in the laser beam path and movable along the axis of the laser beam path, and wherein the controller and/or the mechanical coupling device is designed such that the movement of the slide and/or the compensating lens is carried out along the axis of the laser beam path based on the movement of the lens being carried out so as to compensate the movement of the point of impingement of the laser beam on the rear focal plane caused by the movement of the lens such that the laser beam continues to pass through the fixed point of the rear focal plane of the lens and stays focused onto the sample.

8. The laser microscope system according to claim 6, wherein the optical laser system contains a scanning device configured to move the laser beam focus perpendicularly to the optical axis in the object plane.

9. The laser microscope system according to claim 8, wherein the scanning device has two optical wedges rotatable about the axis of the laser beam path, wherein a resulting deflection angle of the laser beam to the optical axis is variable by rotating the optical wedges, and wherein the laser beam is configured to pass through the fixed point of the rear focal plane of the lens for all deflection angles.

10. The laser microscope system according to claim 8, further comprising a deflection mirror configured to couple the laser beam path into the optical axis of the lens, wherein the deflection mirror is arranged downstream of the scanning device, and wherein the slide is configured to carry elements of the optical laser system that are arranged upstream of the deflection mirror.

11. The laser microscope system according to claim 8, wherein the optical laser system comprises the compensating lens arranged in the laser beam path and movable along the axis of the laser beam path, and wherein the compensating lens is arranged downstream of the scanning device.

12. The laser microscope system according to claim 8, wherein the offset lens is arranged upstream of the scanning device.

13. The laser microscope system according to claim 6, further comprising the illumination device with the light source and a downstream optical illumination system configured to generate an illumination beam path, wherein the optical illumination system has a deflection mirror configured to couple the illumination beam path into the optical axis of the lens.

14. The laser microscope system according to claim 1, further comprising a downstream optical illumination system configured to generate an the illumination beam path from light from the light source, wherein the optical illumination system has a deflection mirror configured to couple the illumination beam path into the optical axis of the lens.

15. The laser microscope according to claim 1, wherein the optical laser system has the compensating lens which is arranged in the laser beam path and is movable along the axis of the laser beam path, and wherein the controller and/or the mechanical coupling device is configured to carry out the movement of the compensating lens along the axis of the laser beam path based on the lens being moved so as to compensate the movement of the point of impingement of the laser beam on the rear focal plane caused by the movement of the lens such that the laser beam continues to pass through the fixed point of the rear focal plane of the lens and stays focused onto the sample.

16. The laser microscope according to claim 1, wherein the laser is an ultraviolet laser.

* * * * *